United States Patent [19]

Decroix et al.

[11] 4,353,107
[45] Oct. 5, 1982

[54] ELECTRICAL CAPACITOR

[75] Inventors: Jean-Yves Decroix, Arras; Gerard Seytre, Sainte-For-les-Lyon; Pierre Charlot, Quetigny; Jean-Claude Dubois, Cressely, all of France

[73] Assignees: CdF Chimie, Societe Chimique des Charbonnages, Bully-les-Mines; Thomson-CSF, Paris, both of France

[21] Appl. No.: 234,502

[22] Filed: Feb. 17, 1981

Related U.S. Application Data

[63] Continuation of Ser. No. 948,589, Oct. 4, 1978, abandoned.

[30] Foreign Application Priority Data

Oct. 5, 1977 [FR] France .............................. 77 29986

[51] Int. Cl.³ .............................................. H01G 4/20
[52] U.S. Cl. .................................... 361/323; 525/240
[58] Field of Search ......................... 361/323; 525/240

[56] References Cited

U.S. PATENT DOCUMENTS

| 3,356,765 | 12/1967 | Musso | 525/240 |
| 3,484,664 | 12/1969 | Liddicoat | 361/323 X |
| 3,808,304 | 4/1974 | Schrimer | 525/240 X |
| 3,832,270 | 8/1974 | Schirmer | 525/240 X |
| 4,075,290 | 2/1978 | Denzel | 525/240 |
| 4,078,020 | 3/1978 | Rose | 525/240 |

Primary Examiner—Richard R. Kucia
Attorney, Agent, or Firm—Finnegan, Henderson, Farabow, Garrett & Dunner

[57] ABSTRACT

The dielectric spacer between the conductive electrodes of an electrical capacitor is a biaxially oriented film made from a mixture of less than 80 percent by weight of isotactic polypropylene and more than 20 percent by weight of isotactic polybutene-1.

10 Claims, 1 Drawing Figure

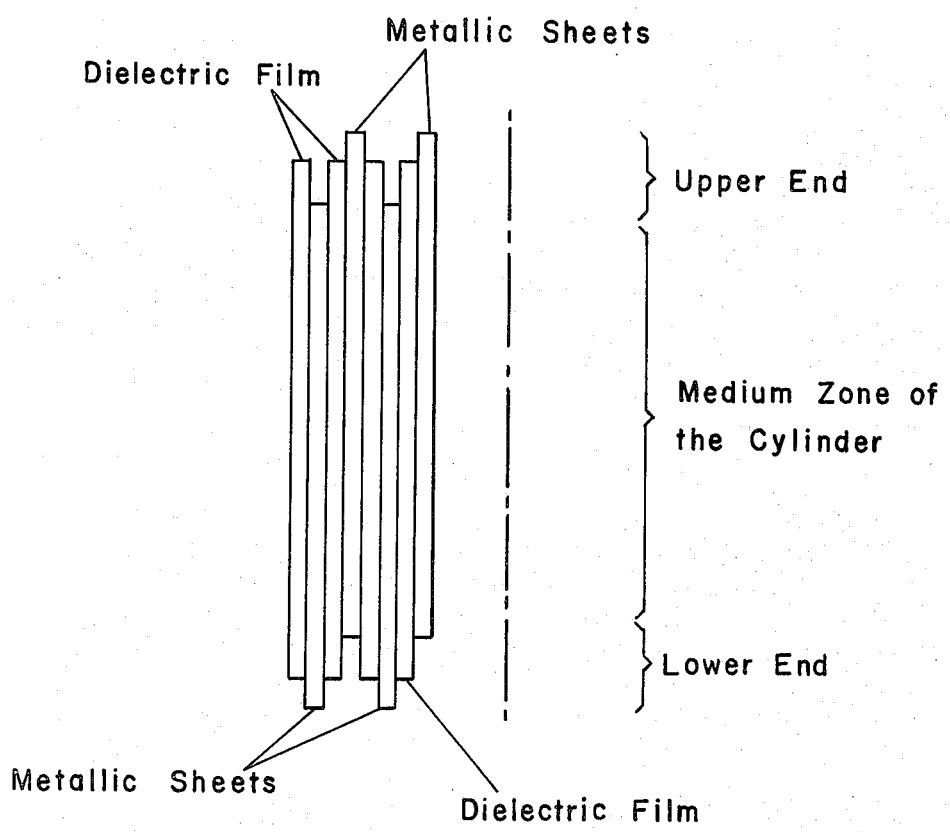

ELECTRICAL CAPACITOR

This is a continuation of application Ser. No. 948,589, filed Oct. 4, 1978, now abandoned.

BACKGROUND OF THE INVENTION

The present invention relates to electrical capacitors having synthetic resin film dielectrics.

For many years the electrical industry has sought capacitors that are satisfactory in terms of reliability, dielectric properties, heat resistance, and cost of production. Capacitor dielectric spacers have recently been made of synthetic resin films such as polystyrene films, which are non-metallizable, and polypropylene films, which are easily windable, easily metallizable, and resistant to moisture.

Polypropylene films, either metallized or not, have already been widely used as capacitor dielectric spacers for many applications with or without the use of a dielectric liquid impregnant. However, a particular feature of polypropylene films is the very high amplitude of change, according to the temperature, of the capacity of capacitors made from them. This feature prevents thermally counterbalancing the variations of inductance of materials like ferrites, the temperature coefficient of which is well defined and equal to 120 ppm (parts per million) per degree centigrade. This feature consequently prevents the use of polypropylene films for manufacturing certain types of capacitors, namely those which are present in telephonic channel by-passes.

The temperature coefficient $K\theta$ of a capacitor is defined as the relative variation of the capacity as a function of the variation of the temperature:

$$K\theta = \frac{\Delta c/c}{\Delta \theta}$$

A material having a temperature coefficient as close to $-120$ ppm/° C. as possible is therefore required for thermally counter-balancing the inductance variations of ferrites. The temperature coefficient of a material, however, is not uniform throughout the entire temperature range to which a capacitor may be submitted, generally ranging from $-55°$ C. to $+100°$ C. Thus polystyrene has a temperature coefficient of $-120$ ppm/° C. that remains constant from $-55°$ C. to $+75°$ C., but it cannot be used at temperatures above 75° C. Furthermore, since it is non-metallizable, metallic sheets must be used for forming the capacitor electrodes, which materially increases the volume of the capacitor. As to polypropylene, it exhibits a significant discontinuity of its temperature coefficient according to the temperature range:

$K\theta_1 = -110$ ppm/° C. from $-55°$ to $+40°$ C.

$K\theta_2 = -340$ ppm/° C. from $+60°$ to $+100°$ C.

SUMMARY OF THE INVENTION

An object of the present invention is therefore to provide metallizable synthetic resin films that may be used as capacitor dielectric spacers, having a temperature coefficient the variation of which between $-55°$ and $+100°$ C. is notably less than that of polypropylene films, and having the low dielectric losses necessary for making high volt-rise circuits. A solution to this problem has been described in French Pat. No. 2,287,093 relating to biaxially oriented films made from copolymers of propylene and ethylvinylether in which the content of the ethylvinylether is from 0.2 to 1.5%; these polymers, however, are not commercially available at the present time. Therefore it was desirable to discover an adequate film that could be made from commercially available synthetic resins.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the electrical capacitor of the invention comprises conductive electrodes and a dielectric spacer between the electrodes. The spacer comprises a biaxially oriented film made from a mixture of less than 80 percent by weight of isotactic polypropylene and more than 20 percent by weight of isotactic polybutene-1.

The electrical capacitor of the invention is made by a process comprising the steps of (a) winding alternately on a cylindrical mandrel (i) a biaxially oriented film made from a mixture of less than 80 percent by weight of isotactic polypropylene and more than 20 percent by weight of isotactic polybutene-1, and (ii) a thin metallic sheet constituting the conductive electrodes, the winding terminating with an outer biaxially oriented film (i), (b) thermally welding the outer film (i) on itself, (c) connecting each electrode to a metallic connection wire, and (d) thermally treating the cylindrical capacitor before connecting the connection wires.

DESCRIPTION OF THE PREFERRED EMBODIMENTS

Reference will now be made in detail to the present preferred embodiments of the invention.

The invention is not limited to any particular method of orientation of the polymer mixtures, an example of which is described in U.S. Pat. No. 3,808,304. It is important, however, for the mixture of polymers to be oriented to be a homogeneous mixture. This can be achieved, for example, by working the components in a heated mixer having two cylinders rotating at different speeds or in a similar device, such as a Banbury mixer. The mixture of polymers may further comprise conventional additives such as heat stabilizers, antioxidants, ultraviolet stabilizers, lubricants and so on.

Since the biaxially oriented film used as a component of the electrical capacitor of the invention may easily be metallized as set forth hereinafter, its conductive electrodes may consist of metallic layers deposited on the biaxially oriented film. Metallization of the film is carried out by depositing a metal such as aluminum or zinc under vacuum according to the usual known techniques, the thickness of the metallic layer being a few hundred angstroms. The thickness of the biaxially oriented film which is present in the electrical capacitor of the invention is preferably between 2 and 25 microns.

The electrical capacitors of the invention are remarkable for the fact that the variation of their temperature coefficient between $-55°$ and $+100°$ C. is notably less than that of electrical capacitors having polypropylene films as a dielectric spacer. This variation has been quantitatively expressed as:

$$\Delta K = K\theta_1 - K\theta_2$$

wherein $K\theta_1$ is the temperature coefficient between $-55°$ and $+40°$ C. and $K\theta_2$ is the temperature coefficient between $+60°$ and $+100°$ C. Thus $\Delta K$ ranges from 50 to 120 ppm/° C. for the capacitors of the invention whereas $\Delta K$ is 230 ppm/° C. for capacitors of polypropylene films. Moreover their dielectric constant is maintained and their dissipation factor is not modified in a broad frequency range.

As to the process for making the capacitor of the present invention, of course, as described hereinabove, the thin metallic sheet (ii) may be a metallic layer deposited on the biaxially oriented film (i). The cylindrical mandrel upon which the layers are wound may be taken out of the capacitor when the desired capacity value has been achieved, thereby leaving an air-filled space having a radius of, for example, a few millimeters. Clamping of the outer film (i) may of course be effected by other methods equivalent to the step (b) of thermal welding. The metallic sheets or layers are narrower in the longitudinal dimension of the cylinder that the dielectric films and alternate metallic sheets are shifted in opposite directions beyond the ends of the cylinder. Consequently, where an electrode extends beyond the lower end of cylinder, the upper end of cylinder has an electrode-deprived space between the dielectric films. The electrode closest to an electrode extending beyond the lower end of the cylinder extends beyond the upper end of the cylinder leaving electrode-deprived spaces at the lower end of the cylinder. In the end product, therefore, the metallic layers project successively from alternate ends of the capacitor. The drawing illustrates an embodiment of a capacitor according to this description. The connection of each electrode to a metallic connection wire of step (c) is effected either by a direct welding (electrically or by bringing up a tin alloy) or, in the case of a metallized dielectric spacer, by projecting a fused alloy on the lower and upper ends of the cylinder for example by means of an oxyacetylene blowpipe. The latter technique is commonly designated as shoopage. After the winding step and before welding the connection wires, the cylindrical capacitors are treated thermally in order to stabilize them mechanically and electrically.

Capacitors of other shapes, such as a parallelepipedic shape, may also be produced by forming, from a metallized biaxially oriented film used in the invention, strips either circular or not and comprising a great number of layers, and then cutting out the strips so as to yield the desired shape.

The climatic and mechanical protection of the capacitors of the invention may be effected by different methods such as:

trimming with adhesive ribbons and running an epoxy resin or another dielectric material into the ends of the capacitor, moulding, encasing in a metallic or plastic case and casting epoxy resin.

Electric tests should be effected on unit-elements during the manufacturing process of the capacitor and at the final step of manufacture.

The invention will be better understood by reference to the following non-limiting examples.

EXAMPLES 1 TO 9

Measuring samples were prepared by first dissolving in hot toluene and then coprecipitating mixtures of isotactic polypropylene (PP) and isotactic polybutene-1 (PB), the weight proportions of each component of the mixture being indicated in the table hereinafter. These measuring samples were worked up by compression moulding under primary vacuum to avoid any oxidation problem. The resulting films, having a thickness of about 150 microns, were metallized by means of aluminum according to the conventional technique. The electrical properties of the metallized films were determined by means of a cell which may be exhausted in the frequency range between 20 Hz and 20 KHz and in the temperature range between $-55°$ and $+100°$ C. In these temperature and frequency ranges, all mixtures exhibited a single relaxation peak, which may be attributed to vitreous transition and which demonstrates a good compatibility of the polymers in the amorphous phase. The following properties were measured:

dielectric constant $\epsilon$ at 1 KHz and 40° C.;

dissipation factor tan $\delta_1.10^{-4}$ at 1 KHz and 60° C.;

dissipation factor tan $\delta_2.10^{-4}$ at the maximum of the relaxation peak;

temperature coefficient $K\theta_1$ between $-55°$ and $+40°$ C., in ppm/° C.;

temperature coefficient $K\theta_2$ between $+60°$ and $+100°$ C., in ppm/° C.

All these experimental results will be found in the table hereinafter, which further includes the property $\Delta K$ calculated according to the relation:

$$\Delta K = K\theta_1 - K\theta_2.$$

It should be understood, of course, that Examples 1 and 2 are comparative examples whereas Examples 3 to 9 are examples illustrating the invention. Similar measurements have been made on metallized biaxially oriented films having a thickness of about 5 microns and have supported the same conclusions about the above-mentioned electrical properties in the entire range of the compositions of the invention.

It will be apparent to those skilled in the art that various modifications and variations could be made in the electrical capacitor of the invention without departing from the scope or spirit of the invention.

| EXAMPLE | % PP | % PB | $\epsilon$ | tan $\delta_1.10^{-4}$ | tan $\delta_2.10^{-4}$ | $K\theta_1$ | $K\theta_2$ | $\Delta K$ |
|---|---|---|---|---|---|---|---|---|
| 1 | 100 | 0 | 2.48 | 0.2 | 1.0 | −110 | −340 | 230 |
| 2 | 90 | 10 | 2.50 | 0.4 | 1.9 | −120 | −330 | 210 |
| 3 | 80 | 20 | 2.50 | 0.6 | 2.3 | −160 | −270 | 110 |
| 4 | 67 | 33 | 2.48 | 0.4 | 2.1 | −160 | −270 | 110 |
| 5 | 33 | 67 | 2.52 | 0.7 | 3.0 | −170 | −250 | 80 |
| 6 | 20 | 80 | 2.50 | 1.0 | 3.2 | −150 | −210 | 60 |
| 7 | 10 | 90 | 2.54 | 0.7 | 3.4 | −140 | −190 | 50 |
| 8 | 5 | 95 | 2.51 | 1.3 | 3.6 | −150 | −230 | 80 |

-continued

| EXAMPLE | % PP | % PB | $\epsilon$ | $\tan \delta_1 . 10^{-4}$ | $\tan \delta_2 . 10^{-4}$ | $K\theta_1$ | $K\theta_2$ | $\Delta K$ |
| --- | --- | --- | --- | --- | --- | --- | --- | --- |
| 9 | 0 | 100 | 2.51 | 1.8 | 4.6 | −150 | −270 | 120 |

What is claimed and desired to be secured by U.S. Letters Patent is:

1. An electrical capacitor comprising conductive electrodes and a dielectric spacer between the electrodes, said spacer comprising a biaxially oriented film made from a mixture of 5 to 80 percent by weight of isotactic polypropylene and 20 to 95 percent by weight of isotactic polybutene-1.

2. An electrical capacitor according to claim 1, wherein the conductive electrodes consist of metallic layers deposited on the biaxially oriented film.

3. An electrical capacitor according to claim 1, wherein the thickness of the biaxially oriented film is between 2 and 25 microns.

4. An electrical capacitor according to claim 2, wherein the metal of the metallic layers is selected from the group consisting of aluminum and zinc and the thickness of the metallic layers is a few hundred angstroms.

5. An electrical capacitor according to claim 1, wherein the difference $\Delta K = K\theta_1 - K\theta_2$ between its temperature coefficient $K\theta_1$ in the temperature range from −55° to +40° C. and its temperature coefficient $K\theta_2$ in the temperature range from +60° to +100° C. is between 50 and 120 ppm/° C.

6. A biaxially oriented film made from a mixture comprising 5 to 80 percent by weight of isotactic polypropylene and more than 20 to 95 percent by weight of isotactic polybutene-1, having deposited thereon a metal layer having a thickness of a few hundred angstroms.

7. An electrical capacitor according to claim 1, wherein said biaxially oriented film is made from a mixture of 67 to 95% isotactic polybutene-1 and 33 to 5% isotactic polypropylene.

8. An electrical capacitor according to claim 1 wherein said biaxially oriented film is made from a mixture of 80 to 90% isotactic polybutene-1 and 20 to 10% isotactic polypropylene.

9. A biaxially oriented film according to claim 6, made from a mixture comprising 67 to 95% isotactic polybutene-1 and 33 to 5% isotactic polypropylene.

10. A biaxially oriented film according to claim 6, made from a mixture comprising 80 to 90% isotactic polybutene-1 and 20 to 10% isotactic polypropylene.

* * * * *